(12) United States Patent
Weisenberg

(10) Patent No.: US 7,591,901 B1
(45) Date of Patent: Sep. 22, 2009

(54) METHOD AND APPARATUS OF LINING PIPES WITH ENVIRONMENTALLY COMPATIBLE IMPERVIOUS MEMBRANE

(76) Inventor: Kent Weisenberg, 5418 Merritt Island Dr., Apollo Beach, FL (US) 33572

( * ) Notice: Subject to any disclaimer, the term of this patent is extended or adjusted under 35 U.S.C. 154(b) by 0 days.

(21) Appl. No.: 12/476,983

(22) Filed: Jun. 2, 2009

(51) Int. Cl.
  *B05B 13/06* (2006.01)
  *B05B 3/00* (2006.01)
  *B05B 3/10* (2006.01)
(52) U.S. Cl. .................. 118/306; 118/317; 118/323; 239/223; 239/224
(58) Field of Classification Search ........... 118/306, 118/317, 323, DIG. 10, 712, 713, 321; 239/242, 239/703, 223, 224, 222.11, 752, 753; 427/230, 427/236, 421, 140; 405/184.1, 184.2
See application file for complete search history.

(56) References Cited

U.S. PATENT DOCUMENTS 3,876,465 A * 4/1975 Prazak, III ............... 427/64

| | | | |
|---|---|---|---|
| 6,699,324 B1 | 3/2004 | Berdin et al. | |
| 6,986,813 B2 | 1/2006 | Davis | |
| 2003/0172871 A1 | 9/2003 | Scherer | |
| 2007/0181061 A1 | 8/2007 | Whittle | |

* cited by examiner

*Primary Examiner*—Yewebdar T Tadesse
(74) *Attorney, Agent, or Firm*—David McEwing

(57) ABSTRACT

A method and apparatus for remotely installing a monolithic liner in a conduit is disclosed. The apparatus includes a main component body including electromagnetic actuators, pneumatic cylinders, linear actuators relays, solenoids, ion generator, attachment points for tethers, umbilical, cameras and diameter specific guides and a reciprocation head attached thereto. The longitudinally traversing reciprocation head incorporates a fluid driven rotary turbine motor assembly communicating with shaft and self cleaning dissipation device integrating both conical and inverted cone surfaces. Also included on the reciprocating assembly is an impingement block for the efficient mixing of products and a termination mechanism for the precise remote control of product flow. Additionally, the assembly provides the ion generator to direct a stream of negatively charged air flow to the shaft and the diffusion device to effectively prohibit excess material accumulation.

16 Claims, 3 Drawing Sheets

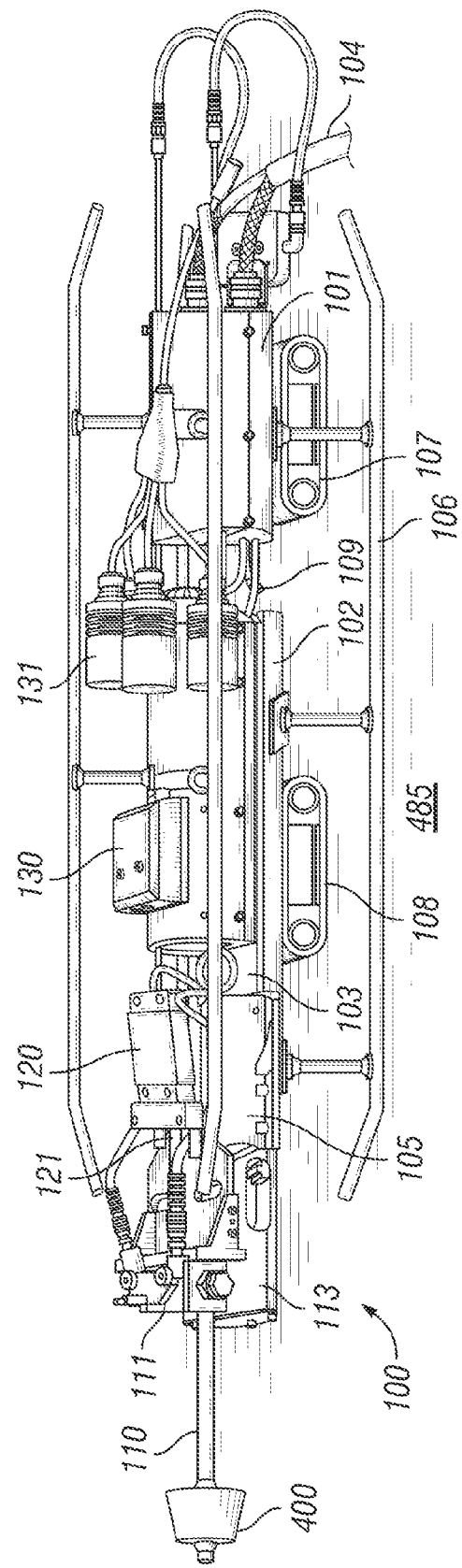

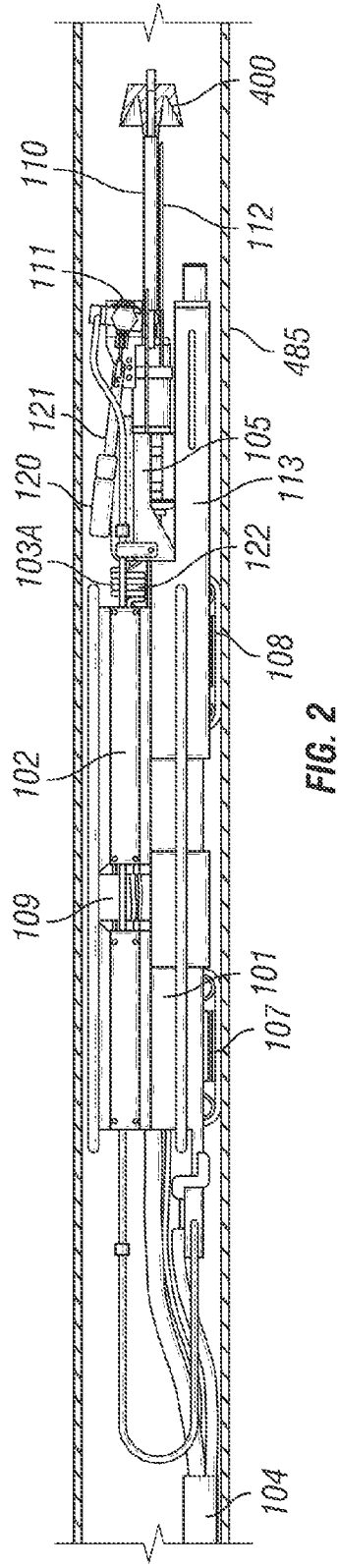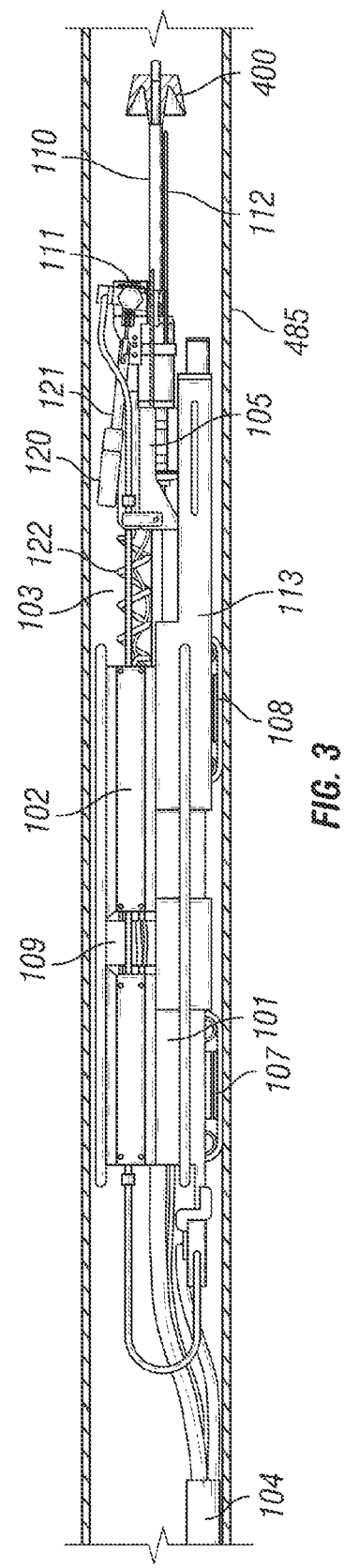

METHOD AND APPARATUS OF LINING PIPES WITH ENVIRONMENTALLY COMPATIBLE IMPERVIOUS MEMBRANE

BACKGROUND OF INVENTION

1. Field of the Invention

With general infrastructure within the US and around the world in a precarious state of decay it has been the object of many to provide for a cost effective method to perform in situ-rehabilitation of these properties. In the industrial sector, pipe and transmission lines carrying volatile and dangerous or hazardous materials are constantly at risk of failure due to age, neglect or lack of funds to replace or repair with traditional methods. In the global municipal arena, waste collection and water distribution systems are seriously compromised with failures creating community disturbances, commercial loss and environmental incidents. The US EPA Clean Water Act of 1989 outlines mandatory restrictions and covenants imposed on municipalities to improve the conditions of their water and wastewater systems. The EPA Conference of Mayors report of 2007 surveyed 1500 US Cities' infrastructure needs resulting in $15B in needed repairs and upgrades. The RSCA has also increased scrutiny on chemical processing facilities, petrochemical facilities and pipeline transmission calling for proactive inspection and repair of millions of miles of pipe, conduit and passageway.

The conventional lining materials and methods have undesirable environmental impacts, e.g., leaching of styrene's, CFC's, VOC's and endocrine disruptors into the effluent. Effects of endocrine disruptors are believed to include growth defects and may result from relatively minor exposure to chemicals.

An additional undesirable impact results from the annulus created between the interior pipe wall and the liner. This annulus not only propagates infiltration but also exfiltration—the toxic effluents going back into the surrounding ground, ground water, lakes, streams and aquifers. The conventional resins are thermosetting resin. These resins shrink causing an annulus to form between the pipe wall and the liner. This annulus permits infiltration of ground water into the pipeline flow as well as pipeline effluent into the soil and ground water.

Generally the only reason that customers have their pipes rehabilitated is due to erosion, corrosion, cracks and leaking joints. In a method that leaves an annular space, the method only allows for the exfiltration in the future. The way this happens is that in the initial installation, the annular space between the method and the manhole or vault is sealed with mortar or some other material. At that time (after repair) it will pass a hydrostatic test but as age, corrosion, erosion and the constant pressure continue from infiltration at the manhole will work on the seal, causing the seal to begin to leak. The infiltration then gets into the effluent that is flowing through the manhole. Likewise the material flowing through the manhole can get into the annular space finding cracks and open joints therefore exfiltrating to the surrounding soils and water table around the pipe.

Footprint as defined in this disclosure would be that the other rehabilitation methods are required to have their vehicles and equipment right at the manhole/pipe access to facilitate their repair process. Due to access often times being in yards, medians, fields, woods, creeks, etc., the vehicles tear up soils, grass, remove trees, etc. Most often these methods have to excavate the manhole or vault to facilitate inserting their liners. Often times in creek or drainage culverts the contractors have to put their equipment directly in the water thereby leaking oils, fuels, etc. into the water. Also in these applications, the thermosetting resin leaches into the rivers, creeks, lakes, ponds, killing fish and organisms etc., due to inflation of the "bag" or "sock" with hot water or steam. Additionally with cured in place, (hereinafter "CIPP") and use of high density polyethylene (hereinafter "HDPE") used in slip lining, the pipe capacity is downsized so much that the rehabilitated (narrowed) pipe increases flow velocities. This results in creek scour that causes loss of stream banks, plant life and animal life. Additionally in these applications with the water infiltrating into the annular space through joints and cracks, the infiltrating water beings surrounding soils with it. In time this results in a large voids around the pipe and causing the formation of sink holes (economic as well as environmental) in roads and yards caused by soils getting into the pipe.

The method of the present invention does not create an impact of leaching CFC's, VOC's, or endocrine disrupters being emitted into air, water and effluent and the method does not cause a footprint due to the use of an umbilical allowing equipment to be as much as 400 feet or more from the access point of the pipe. The umbilical can traverse unlimited times around buildings, trees, etc via the use of roller quadrants. Contractors using the apparatus or method of the invention do not have to dig up or disrupt access paths as the umbilical is only 2" in diameter and can be inserted into any access.

The present invention generally relates to apparatus and methods for applying a liner to the interior surfaces of pipes, conduits and passageways. The disclosure also more specifically speaks about the ability to remotely apply a consistent and continuous lining in a pipe. The liner is inert after application and does not contain and/or leach volatile organic compounds (VOC's) or chlorofluorocarbons "CFC" or hydro fluorocarbons "HCFC's" or endocrine disruptors.

2. Description of Related Art

Prior art demonstrates numerous methods to rehabilitate pipelines, conduits and passageways from the inside in order to restore asset integrity.

In situ repair methods incorporating a resin impregnated fiber lining tube are described by Wood et al, U.S. Pat. No. 5,409,561 and Kliest, U.S. Pat. No. 6,427,726. In these cured-in-place (CIPP) methods, conventional resins include polyester, vinyl ester and even epoxy resin form a matrix with a tubular textile material, positioned within the deteriorated pipe section, are forced into intimate contact with the pipe interior surface and allowed to cure. The cure time may be hours or days. There are many instances and conditions where the above methods are either not practical or are unsuitable.

Davis U.S. Pat. No. 6,986,813 describes utilizing a polymer product that is sprayed onto the interior pipe walls to form a seamed monolithic liner. A seamed monolithic liner is created by the inability of the lining method or apparatus to continuously line a section of pipe. As a result there are stop points in the lining and replacement lining overlaps the previously applied liner, thereby causing a seam. This patent attempts to overcome many problems identified in prior art. Typical, prior art spray in type liners experience major problems as evidenced in the plugging of spray tips, slow curing coatings resulting in surface sags and inconsistent material application thickness and other constraints resulting in finished liner thicknesses in the 0.200-0.400 inch range, rendering them unsuitable for many applications.

Davis attempts to overcome the first constraint of spray tip plugging by incorporating a blow off mechanism attached to the tip of the spray gun in an effort to eliminate plugging during operation. Additionally, Davis purports to employ a fast setting material to eliminate sags. The combination of these two assumed improvements actually result in a compounded problem. The Davis patent teaches continuous blowing of air through the time of the spray gun as a method to prevent clogging. Unfortunately adding air flow to the product stream only increases the atomization of the spray resulting in higher static attraction to moving parts. Purging the spray tip with compressed air does not eliminate the plugging problem. A splatter shield is also mentioned to deflect errant spray material from occluding the spray orifice. In practical operation, the root cause of the repeated clogging of the spray tip is more a function of design.

In Davis, a spinning flat or slightly obliquely angled disc is used to propel the projected fast setting lining material onto the pipe walls. This flat or slightly obliquely angled spinning disc design as it relates to the direct right angle diffusion of the spray causes a significant amount of rebounding/ricochet lining material to accumulate on the splatter shield and air blow off mechanism, ultimately resulting in total blockage of the tip and other crucial mechanical functions within a short period of time. This does not allow for continuous operation or lining of more than 10-20 feet of pipe without the need to retract the apparatus and clean.

The spinning disc design of Davis fails to satisfy the requirement for a uniform lining thickness as well. As described, the resultant physics do not afford equal dissipation of lining material in the full 360 degrees of circumference. As the fast setting material is projected at the spinning disc at a generally perpendicular angle, the high speed of the spinning disc induces a disproportionate amount of material to the first 90 degree arc that is quickly thrown to the pipe walls. The current apparatus due to its flat or slightly oblique design does not afford the coating material any dwell time to equalize mass and distribute the coating material around the circumference of the disc prior to being ejected. This ultimately results in thicker coating or lining in the first 180 degrees of circumferential arc of the pipe wall. This presents an unacceptable condition when uniformity is necessary to calculate ultimate liner properties and performance which is required by end users.

Static Build Up:

There is no consideration in prior art for the disruption caused by static build up.

Static build up is caused by the high rpm's of the shaft and disc as they relate to close proximity to pipe wall and the inherent need due to lining cure. Forced air is not a cure for static build up. Static build up is controlled through high pressure and high heat impingement of the lining components only. The forced dry air is to keep the pipe surface as dry as possible and to keep product mist from coating camera lenses as well as to force dry air to assure a dry working environment for the apparatus.

Static build up in prior art is compounded by the fact that the apparatus uses a "spray" pattern to send material from the tip to the spinner disc. This spray naturally causes atomization of the lining material which results in more static charge and also makes it easier for the static attraction of the shaft and disc to "pull" the material as it passes by these parts.

This static attraction between coating materials and the shaft/disc result in material stalactites and stalagmites depending on their positional relationship to these devices.

These formations will in time severely impede if not halt the apparatus' ability to continually line the pipe.

The build up of these formations will divert the flow from the tip to the spinner disc resulting in additional disproportionate distribution of coating material to the pipe wall.

Formations continue to grow as the lining process proceeds.

Formations eventually break off due to their increased weight and centrifugal force being applied.

Formations that get imbedded in the uncured liner causing profiles in the flow channel that will result in diminished flow capacity of the liner due to increased coefficient of friction. Also the imbedded pieces causes "snag" areas in mixed effluent pipelines such as sewage which results in solids—toilet paper etc—getting caught on them and building up sometimes to block pipeline flow.

Formations that are imbedded in the in the first few oscillation strokes of the apparatus end up diverting or blocking the coating material from ever reaching the pipe wall due to the straight projection off the spinner disc. This creates through voids in the finished liner.

This situation results in the need to remove the prior art apparatus from the pipe and clean many times to actually complete a full liner application hence diminishing the claims of a faster method in prior art.

Spinner Disc Build Up:

Current art has an inherent design that has no way of stopping the build up of coating material on the spinner disc.

In prior art the spinner disc is subject to a "spray" formation from the tip.

Utilizing a spray pattern creates a "dry fall" effect at the point the coating hits the spinner disc. This does not allow the disc to totally disperse the lining material as the material does not have the weight and mass needed to completely propel off the disc effectively. It does not have the wet out capabilities of a tightly uniform stream of lining material as taught by the instant disclosure.

In prior art, spray is immediately propelled from tip at a set pressure which in turn slows the rpm of the spinner disc due to direct force applied by the sprayed coating material velocity. The initial required rpm is then never fully achieved. The spinner motor from this point on is trying to regain the initial rpm with failure.

A standard pneumatic motor is used in the prior art. The pneumatic motor produces high rpm's and low torque. Air motors have been found to be a necessity as electric motors with high rpm/high torque are too large for the apparatus in small diameter pipe. Hydraulic units work but the need to supply hydraulic pressure at 500 feet requires bulking up the umbilical with hoses, adding costly pumps and additional weight and diameter to the umbilical.

The above mentioned "dry fall" effect starts to gradually slow the rpm of the spinner disc due to the weight of the resulting build up. As the rpm slows due to low torque, the effect becomes greater and greater having a "snowball" effect on the apparatus, completely stopping the spinner disc and ultimately rendering the apparatus incapacitated in as little as 10 minutes.

This results in lining material still being projected from the tip without being dispersed by the disc. The material then drips to the bottom of the pipe resulting in piles of lining only on the bottom of the pipe.

This results in the need to constantly remove the apparatus from the pipe and clean the shaft and disc which can take hours then reinserting to once again line for a short amount of time. This is a constant procedure with prior art. This consistent required retraction and insertion can result in inter-coat de-lamination of the liner due to possible contamination of the already installed liner while the retraction process and cleaning process is being completed.

In prior art it is stated that the apparatus can line for hours and from intervals of 300-600 feet. This, however, is not possible in a single insertion and retraction cycle. This adds considerable time to the process evacuating any advantage in time or economics over other lining methods as stated in prior art.

Trajectory Geometry:

Prior art utilizes a flat or maximum oblique angle in its spinner disc. This design results in a straight stream of dissipation off the spinner disc.

Prior art uses relatively slow oscillation of the spinner disc rod with long smooth linear strokes to overlap material to prevent sags and runs. This remains a tight straight dissipation stream off the disc throughout the oscillation cycle.

The apparatus only coats in one direction in the pipe to complete the coating.

All pipe has a natural profile whether it be at bell/spigot joints, welds, tuberculation etc.

The prior art does not have the ability due to its design, mechanics and straight or right angle stream to completely line the forward or backward edge of these profiles as it relates to the position of the apparatus. The forward side of these profiles do not get coated and therefore there are exposed areas in the existing pipe wall.

Prior art also does not have the ability to reverse the rotation on the spinner disc. There are many times in pipe where there will be a lateral intrusion—a small pipe sticking into the main pipe—the maximum penetration is usually ¾". In this instance there is no way that lining can be placed on the underside of this intrusion pipe or any profile for that matter without counter rotation. The apparatus of the instant invention has the ability to counter rotate either through transfer or air from exhaust to intake and reverse. More typically this is done through electronically switched bi-directional transmission or transfer case that is in between the shaft and the air motor collet. The reason for this is that on high rpm air motors they easily wear out if they are run in both directions. Compounding this problem in the prior art is that the unit does not have the ability to start and stop flow. Flow must be stopped while the motor is being reversed in rotation.

Multiple Starts and Stops:

Prior art design and mechanics do not allow to open and close the valving rod or spray tip stopper more than one open and close cycle. The prior art uses a spray tip orifice that is machined so that the valving rod seats inside it. When this is open, spray comes through the orifice. It is then closed and residual mix material encapsulates this area and basically locks it into that position. The prior art mechanics does not have the pull force or the ability to have a momentum surge on the valving rod to break this free—hence the valving rod cannot be remotely opened up more than one cycle—open/close—done. The present invention apparatus uses a different sealing method at the interface of the termination rod (valving rod in prior art) end and the stream orifice to seal—mixed product encapsulation of the area is made to be a minimum through this design. The instant invention also has a different design of the termination rod actuator—it has a much higher pull force coupled with a function that allows for some "free" pull force momentum to build prior to actuating the termination rod. This allows the rod to brake free therefore allowing unlimited open and close cycles.

Regarding the prior art, in the event that there is a malfunction in control systems or an impediment of the umbilical retraction which is common, the apparatus must be disengaged from continuing to spray. If not the result is heavy rings in the liner. If this event happens the apparatus must be retracted from the pipe and the impingement block completely disassembled, cleaned, reassembled and re inserted into pipe. This is a very time consuming process. This design and mechanical flaw also does not allow the apparatus to complete sleeve or individual repairs in the pipe unless you do them one at a time due to the necessity to clean after every valving rod cycle.

Dimensional Restrictions on Insertion and Retraction:

Equipment of the prior art, due to its overall length, cannot be inserted or retracted from an underground pipe with the access being a manhole or vault with a diameter or horizontal dimension or less than 5 feet.

This overall dimension is the direct result of the claims for the method/mechanics of oscillation to afford slow dissipation and overlapping of the lining material.

Additionally the 23" bend radius and mechanics of the attachment bracketing of the prior art umbilical is such that it significantly increases the overall dimension of this apparatus.

Typically in the private sector and in the municipal market sectors all underground pipes are only accessible through the above mentioned accesses. Rarely is there excavation afforded to allow insertion of apparatus into the pipe. The prior art apparatus can be disassembled then reassembled as it is being inserted in the pipe. This is a very time consuming process. This, however, does not afford this apparatus the ability to coat the entire pipe. The unit must stop lining to be disassembled on retraction. This stoppage must occur in manholes and vaults with a diameter of horizontal dimension of less than five feet. This results in as much as 16"-30" of pipe not being coated in a typical manhole or vault. There is currently no acceptable way afterward to line this section that is void of lining material. Prior art creates a void or in the pipe lining for the pipe not the manhole. Due to its length from the oscillation stroke, the umbilical bend radius and equipment design, the prior art lining equipment has to be stopped in a 4' manhole with 30' of the robot still inside the pipe. At this point all lining processes must be stopped. There is no way after this in a small diameter pipe to get in and manually line the pipe section that was missed.

Due to the design and mechanics of the prior art, it cannot line vertical pipe or pipe with a slope of more than 30 degrees.

Diameter:

Due to the design and mechanics of the prior art, it cannot be utilized in a pipe with a diameter of less than 10". Prior art states that it can be used in 6" pipe. The basic dimensions however do not allow for this as filed in the drawings. This is evident to a person skilled in the art after examination of the detailed description of the equipment in Davis U.S. Pat. No. 6,986,813 discussed above. Review of the description and drawings demonstrate it would be impossible to be short enough or narrow enough to fit into a 6" pipe.

Over and above the fact that the unit's dimensions restrict its ability to line pipe with diameters less than 10", its function of mechanics also severally impedes this ability. The unit utilizes oscillation. This results in all oscillating parts to be on the exterior of the apparatus and in close proximity to the pipe wall. No matter how long the determined length of that oscillation may be (5"-36") the entire length and width of the carriage or shuttle plate is moving. Pursuant to prior art drawings this length is longer that the length of the base assembly when the spray head is considered. Example: if the oscillation is set for 10", the entire length of the unit is moving 10" on every stroke exposing the entire length to profile or offsets. The full width and length of the upper apparatus shuttle plate is in motion. The apparatus as designed also has many right angle projections that can get caught on joints and or profiles in pipe wall.

Additionally due to the apparatus design and mechanics as it relates to external part oscillation it is very easy for it to get "hung up" in small diameter pipe. All pipe systems have profiles, sags and offsets. When the current apparatus encounters these obstructions it will stop the oscillation process. This may only be momentary or for extended lengths of time. In either case it causes a build up or "ringing" in the new coating which is unacceptable. If the stoppage of oscillation occurs for an extended length of time it can actually close off the pipe entirely with lining material and/or lock the apparatus in the pipe.

The external oscillation parts are all on the exterior of the unit. This exposes them to all the overspray and existing contaminants that are in the pipe while being coated. This eventually impedes their function resulting in diminished capabilities or incapacitation.

SUMMARY OF DISCLOSURE

This disclosure teaches an in situ pipe liner spay apparatus and method that allows spraying of an isocyanate and amine resin mixture or other mixtures onto the 360° circumference of the pipe interior wall. The mixture can line the pipe walls. The lining components are mixed in correct proportion in the impingement block of the apparatus within the pipe. The components may be heated within the apparatus for fast reaction and curing on the pipe walls. This avoids slumps or other undesirable variations of the lining layer. The device can apply a lining thickness of between 0.05" and in excess of 4" in a single pass of the spray assembly.

The apparatus includes an umbilical comprising at least one air hose, at least one electrical power cable, at least one video communication cable and lining component hoses. The housing of the apparatus includes at least one heater for heating the lining components.

The disclosure teaches an in situ pipe liner spray apparatus having a reciprocating capability (forward and reverse) of between 0.001" and 5.00" controlled by a reciprocating head. This means the dissipation device and rotating shaft longitudinally moves back and forth relative to the apparatus (hereinafter termed "forward and reverse"). This allows the apparatus to apply multiple layers of lining to the pipe. The dissipation device comprises a dissipation device shaped as two asymmetrical reversely aligned cones with a center top attached to a rotating shaft (extending from the apparatus rotating head) and with an acute angled flange oriented to the reciprocating head.

The reciprocating head of the apparatus includes an impingement block wherein the impingement block mixes the lining components and projects the lining at a specific angle of trajectory to the dissipation device.

The apparatus pressurizes the liquid lining material and allows it to exit from a impingement block nozzle maintaining a near constant diameter stream prior to contacting a conical rotating dissipation device (hereinafter "dissipation device"). The surface of the dissipation device forms an acute angle to the lining stream. The dissipation device may rotate at 20,000 to 45,000 RPM at high torque of approximately 20 foot pounds.

The rotational direction of the dissipation device can be remotely changed from clockwise to counter clockwise. The pressures, velocities and flow rates of the lining material stream can be remotely adjusted to the apparatus via the umbilical connection that is directed out of the stream orifice (or spray tip) to the dissipation device.

The dissipation device has an inverted conically sloped surface contact area proximate to the center top for receiving the lining material stream that decelerates the pressurized stream flow inertia and evens the material dissipation into the outer flange. The dissipation device is designed to be self cleaning by its rotation function and pressurized trimming of excess material, thereby eliminating material build up.

The dissipation device also allows a dwell time for material to evenly distribute inside the compounded conical geometry of the diffusion device prior to being cast onto the pipe wall. This facilitates a symmetrical lining layer on the pipe surface.

The apparatus subject of this disclosure also discharges negatively charged ions over the rotating shaft and dissipation device. This impedes static charge and the resulting coating material build up.

Utilization of a shaft scraper appendage eliminates build up due to any possible static charge or material overspray residuals on the spinner shaft.

It will be appreciated that the linings may have a cure time of 3 seconds to one minute, thereby allowing the application of multiple layers of lining. The apparatus subject of the disclosure may line pipes having interior diameters between 5.5" and 54".

One must first fully grasp the need for exact and precise methods/mechanics required to utilize a remote device for dispensing an ultra fast cure lining material in a pipe and especially in small diameter pipe. Any design flaw, mechanical flaw, or controls system flaw will cause the system to fail in a matter of seconds. These failures can be catastrophic. The material being dispersed typically flash cures or gels in 4-6 seconds. It only takes an instant for the apparatus to become totally incapacitated or even cause its own self engulfment and to get permanently lodged in smaller diameter pipe. While prior art suggests that its methods and mechanics will improve the current technology in spray lining, it does not. It appears that the prior art was only tested and utilized in a lab environment and never tested under real world conditions. The prior art was based on evidence established in short segments of test pipe under ideal conditions. Underground pipe has no ideal conditions.

SUMMARY OF DRAWINGS

FIG. 1 illustrates the apparatus subject of this disclosure. Illustrated is the dissipation device, rotating shaft, impingement block, reciprocating head, front housing and rear housing. Also illustrated are the articulation junctures between the housings and the reciprocation head.

FIGS. 2 & 3 are side views of the apparatus showing the change in position of the reciprocating head to the front housing.

Figure 4:
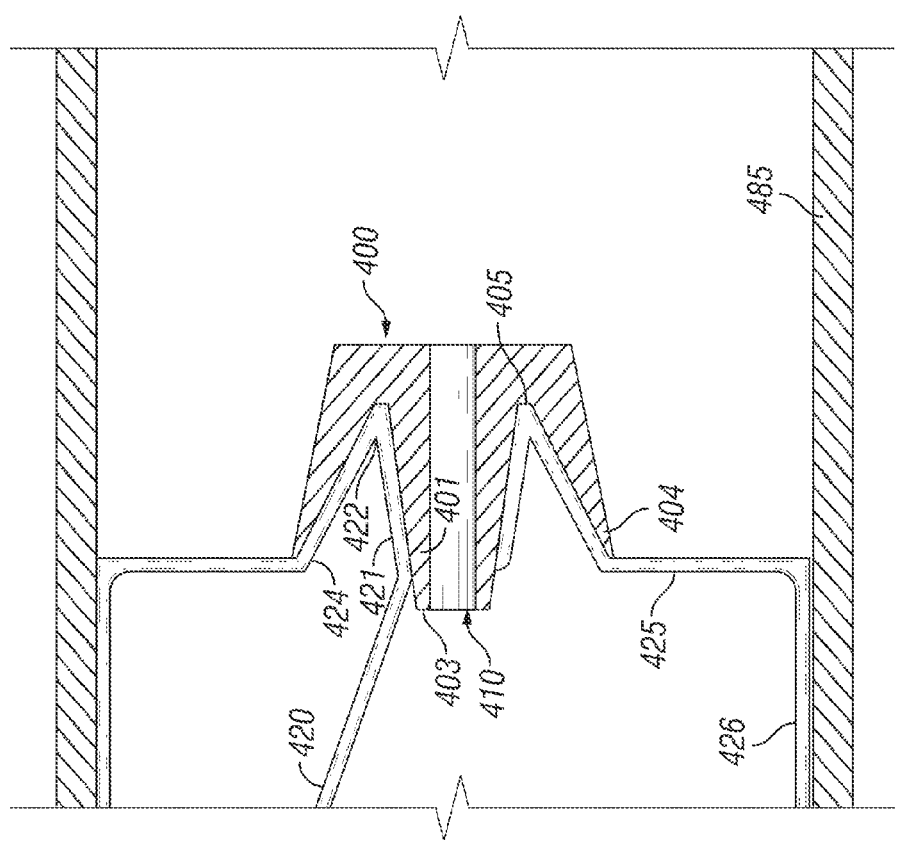
FIG. 4 is a cross sectional view of the dissipation device showing the path of the liner on the device and off the outer device flange for lining a pipe wall.

The accompanying drawings, which are incorporated in and constitute a part of the specification, illustrate preferred embodiments of the invention. These drawings, together with the general description of the invention given above and the detailed description of the preferred embodiments given below, serve to explain the principles of the invention.

DETAILED DESCRIPTION OF DISCLOSURE

This disclosure teaches a method and apparatus that allows remote installation of liners inside pipes for distances exceeding 1,000 linear feet with only one insertion and one extraction of the apparatus. In one embodiment, the liner is a reaction product of isocyanate and amine resin mixed in situ at high temperature and pressure immediately prior to spraying the liner on the pipe wall. In one embodiment, the temperature may be within the range of 140° F. to 170° F. with the ideal temperature of 155° F. The pressure of the liquid components may be between 1700 psi to 3500 psi depending upon the viscosities of the materials and the necessity for molecular cross linking. The cured liner is inert and free of VOC's, carbon fluorocarbons and endocrine disrupters. The cured liner is impervious to influent and effluent. Therefore a liner installed with the apparatus of the invention and the method disclosed herein will stop effluent from entering the ground and ground water.

The disclosure teaches an apparatus that by its design can be remotely inserted and retracted from all manholes and/or vaults with diameters/horizontal dimensions of approximately 18" while still achieving the lining of the entire pipe.

The apparatus of the disclosure teaches an internal forward and reverse assembly, i.e., reciprocating head, rotating shaft and dissipation device, allowing it to be fully functional in small diameter pipes with bends, sags, offsets and joints. The apparatus utilizes articulated junctures separating housing sections and the reciprocating head.

FIG. 1 illustrates a prospective view of one embodiment 100 of the disclosure. Illustrated is the dissipation device 400 mounted on a rotating shaft 110. The rotating shaft extends into the reciprocating head 105 to an air turbine motor (not shown). Mounted on the top of the reciprocating head are the impingement block 111, the connected termination rod 121 and the termination rod actuator 120. The forward housing 102 extends from the articulating juncture 103 separating the reciprocating head and the forward housing. Mounted on top of the forward housing are television cameras. Mounted beneath the housing are wheels 108. Also mounted to the housing are skids 106. Separating the forward housing and the rear housing 101 is the articulating juncture 109. Also illustrated is the umbilical 104 containing air hoses, liquid liner components, television cables and electrical wires. The apparatus is shown on an interior pipe surface 485.

The apparatus is moved at a continuous predetermined speed through the pipe. The articulating spaces between the housing segments and reciprocation head allow the apparatus to traverse around bends in the pipe or over protrusions in the bottom of the pipe. The direction of rotation of the dissipation device is reversible. This allows the dissipation to line all sides of a protrusion within the pipe interior. There are many times when there will be a lateral intrusion, e.g., a small pipe sticking into the main pipe. The maximum penetration is usually ¾". In this instance there is no way that lining can be placed on the underside of the intruding pipe or any profile with counter rotation. The dissipation device can be counter rotated either through transfer of air from exhaust to intake and reverse. More typically this is done through electronically switched bi-directional transmission or transfer case that is that is between the shaft and the motor collet. (High rpm air motors easily wear out if they are run in both directions. The impingement block also has the ability to effectively stop and restart liner flow as required in the rotation reversing process.

The apparatus has a compounded effect through the cohesive mechanical action on the dissipation of the material stream on to the pipe walls. Through the action of the fast high velocity forward and reverse action and the instantaneous stop/start action at the end of each reciprocal stroke, the cohesive mechanical action promotes a "bullwhip" or "wave" geometry of liner material with high velocity. The resulting dissipation stream assures the lining of all sides of profiles (protrusions and insets) in the pipe wall and is not contingent on the apparatus lining in two different directions to achieve full coverage of these profiles. Additionally, the remote control of the apparatus to reverse the rotational direction of the dissipation device affords it the ability to apply lining to the underside of profiles (protrusions and insets). The shape of the dissipation device is designed to be self-cleaning of the lining material through the operation of rotational forces and the cutting forces of the pressurized product streams velocity.

The apparatus maintains the unlimited ability for the supply stream to be remotely started and stopped or adjusted to facilitate stopping for control malfunctions, and the installation of joint sleeve only applications and spot repairs—in pipeline with the need to retract and clean the impingement block in-between every start and stop function. Sleeves are installed in line segments of pipe. They are typically from 2' to 8' in length. Often the pipe is in suitable shape but there may simply be small segments that have cracks or offset joints. In this instance the apparatus would be inserted in the same manner however it would be precisely located at these areas to only line these segments in lieu of the whole pipe. With the ability to stop and start the apparatus unlimited times many of these sleeves can be installed. Sometimes customers will only want a 3' sleeve installed over joints only with the joint being in the center of the sleeve. Installation of these seams is facilitated by use of the video camera at a control station.

A method and apparatus that can line pipe, conduits, structures and passageways from horizontal through varying degrees vertical to fully vertical. Operation in a fully vertical position would require change in the roller quadrants and guides as they would have to be elevated and centered over the full vertical pipe application.

The apparatus subject of this disclosure comprises an umbilical conveying pressurized air and liquid components of the lining material. The two insulated high pressure fluid hoses are heated via a 120V loop circuit. Also included in the umbilical are two twelve wire Kevlar reinforced communication cables. The umbilical includes one or more high heat resistant Kevlar reinforced fluid (air) hoses. The umbilical completely encapsulates the hoses and cables in a dive line Kevlar reinforced semi rigid molded polyurethane sleeve to accommodate strain relief. Other cables or tubes may be connected to the apparatus through the umbilical. There may be a tether attached to the apparatus. The umbilical or tether may extend to the ground surface or to a manhole. The apparatus is remotely controlled by means of the tether or umbilical. The umbilical has a bend radius of approximately between 8" and 12" due to the method of umbilical reinforcements for pulling the robot.

In one embodiment, the umbilical fluid hoses (containing component liquid portions of the liner material) are terminated with a split port coupling block with individual shut off valves. The coupling block can be attached to a receiving block. Both blocks may be located in the lower portion of the rear housing (described infra).

It will be appreciated that the liquid liner components are under high pressure. In one embodiment, the receiving block is machined to accept coupling block with a high pressure seal face and is vertically ported to accept fluid flow from the coupling block. The receiving block is also horizontally ported and threaded at a right angle to vertical ports to receive common JIC fittings. 90 degree JIC fittings are mechanically attached to the receiving block to face in reverse of the forward end of the rear lower housing. In this embodiment preformed radius fluid hoses extend in a reverse direction to the rear lower housing unit for a determined length. The preformed fluid hoses have an approximate 2" radius achieving a horizontal orientation toward the rear lower housing unit. Preformed fluid hoses attach to ¼" ID rigid high pressure stainless steel flare tubing. The tubing is incorporated into machined grooves in both lower rear housing and forward lower housing unit. The tubing is split and then rejoined with flexible fluid hoses at the articulation juncture between the rear housing unit and the forward housing unit.

In one embodiment of the apparatus, the apparatus is comprised of several housing components with articulated junctures between the attached housing units. The umbilical feeds into the housing unit designated the rear housing. Side panels of the housing unit can be opened to provide access to equipment, cables or hoses.

The housing units may contain one or more heaters for the liquid liner components. Polyurea, the product of the mixture of isocyanate and amine resin, needs to mix between 140° F. and 170° F. to acquire the physical properties and full cure. The fluid in the apparatus lines cools quickly. In prior art applications of pipe less than 24", there was not sufficient flow through the lines to stop the product from cooling. Accordingly the qualities of the lining were poor. In the event the unit had to stop for even a few seconds the product cooled too much to start lining. This was due to viscosities becoming very rapidly thixtropic—again as it will shoot out poorly mixed product that is of "goo" consistency and will not flow. The instant application teaches heating the product continually to the point of entering the impingement block. This achieves consistent proper mixing and the ability to start and stop unlimited times as well as simply stop and let the apparatus sit in the pipe for hours and then start lining again. The temperature also affects the cure time of the mixture.

The housing unit may also comprise top mounted electric lamps to illuminate the pipe for the video cameras. This illumination can be particularly useful in large diameter pipes. The next housing unit is designated the forward housing unit. It may contain an air ionization unit generating negatively charged air. It also contains a heater for the lining components.

At least one video camera may be mounted on the top of the forward housing. The camera may contain built in infrared lighting to supply light for the camera. Multiplex video/control cables extend through the umbilical and may be connected to the apparatus via common friction fit electrical connections. Electrical connectors are attached to the apparatus via common threaded, braided stainless steel strain relief fittings attached to the rear housing vertical face machined borings. Once inside the lower rear housing unit, the wires are split. Wires are terminated at the solenoid for the function of the solenoid unit. Wires traverse through the rear lower housing unit in the same manner as the air lines and may be terminated in two 250V relays that are mounted in machined recesses in the forward upper housing unit. These relays work in conjunction with the air solenoid to facilitate in and out functions of the pneumatic actuator for the reciprocating head. Relays may also be connected via wires to electromagnetic sensors that are attached to the exterior of pneumatic actuators. The sensors are fully adjustable along the exterior of the actuators to adjust the stroke length of the actuator function. The stoke length may be determined by the user depending upon the application. In the case of electromagnetic rod actuators, these wires supply power and function to a programmable logic controller (PLC) and actuators.

The pneumatic or electromagnetic reciprocation actuator can be affixed in the forward lower housing unit. Actuator rods traverse through the forward lower housing unit via machined bore in the vertical face of the housing unit and are attached to rear vertical face of the reciprocation head. The reciprocation head is attached to the forward lower housing unit via steel alignment rods via threaded borings in the vertical face of the rear reciprocation head. The alignment rods extend reversely and longitudinally parallel to reciprocation head and penetrate orifices of linear bearings set in machined recesses in between upper forward housing unit and lower forward housing unit. These alignment rods maintain reciprocation head alignment during the reciprocation function. They are protected from damage by enclosure within the front housing unit and the reciprocation head.

Further, a pneumatic or electromagnetic controlled termination rod actuator is affixed to the top of the reciprocation head. As will be discussed, the rod actuator controls the termination rod which penetrates the impingement block. The impingement block mixes the liner components and projects the liner to the dissipation device extending in front of the reciprocation head.

In one embodiment, the termination rod actuator's stroke length in the pneumatic function is a set non-adjustable ⅜". The pneumatic actuator's function is controlled via electrical signal to the solenoid in the rear lower housing unit as previously discussed. The electromagnetic actuators function is controlled via the programable logic controller (PLC).

The reciprocating head is attached to the front housing at an articulating juncture. The reciprocating head is moveable in relation to the forward housing. The reciprocating head can move along the longitudinal axis of the pipe in a forward or reverse direction in relation to the forward housing. This is sometimes referred to as an oscillating motion. In one embodiment, the head moves between 0.001 and 5 inches. The movement of the reciprocating head moves the impingement block and dissipation device in unison. The reciprocating housing moves on rods extending internally within the housing and reciprocating head. This is unlike the prior art and protects the steel rod, which provide stability to the reciprocating head, from damage. The front housing and the reciprocating head are separated by a variable space. This is sometimes referred to as the common reciprocation space. A tether may be attached to the front face of the front housing (preferably beneath the reciprocating head).

Returning to the pathway of the fluid tubing, rigid tubing is joined again with flexible high pressure hose at brackets on both sides of the reciprocating head. Flexible tubing then extends to the impingement block coupling and is joined to the impingement block. The impingement block coupling is vertically ported and machined faced to be received by the machined upper face of the impingement block. It will be appreciated that the design of this embodiment allows the reciprocation head to reciprocate at high speed while allowing high pressure fluid hoses to reciprocate at the point of the mentioned radiuses at the rear housing.

One embodiment of the air pathway from the umbilical attaches via a quick disconnect fitting that is extended in reverse from the lower housing through machined borings in said vertical face of the rear housing unit. An air hose which extends reversely from rear lower housing unit is affixed to rear housing unit via stainless steel braided strain relief. Inside the rear housing unit, the air hose is split via common fitting into to ⅜" ID flexible hoses.

One flexible hose is attached via common fitting to a 4 way 24VDC common solenoid valve mounted in the rear housing unit. The other flexible hose continues through the multiple machined bored orifices, vertical faces of rear and forward housing units. This flexible hose then terminates at the front housing unit front face machined boring. At this termination the air flow is re-established through extendable and retractable pre coiled flexible air hose to facilitate reciprocation at the common reciprocation space. This pre coiled air hose terminates at the rear of the reciprocation head and is mounted in a pre bored orifice in the rear of the vertical face of reciprocation head. The air flow is re-established through the flexible air hose and is connected to the turbine air motor.

FIGS. 2 and 3 illustrate the operation of the pre-coiled flexible air hose 122 located in the articulated juncture 103A between the forward housing 102 and the reciprocating head 105. It will be appreciated that the reciprocating head extends forward from the forward housing in FIG. 3. Also illustrated is the dissipating device 400, the rotating shaft 110, the shaft scraper 112, the impingement block 111, the termination actuator 120 and the termination rod 121. Also illustrated are the front wheels 108 and the back wheels 107, the rear housing 101, the umbilical 104 and the articulated juncture 109 between the rear housing and the forward housing. Also shown is the pipe wall 485.

The second flexible hose at the split in the rear housing unit is attached to the solenoid for air flow to the solenoid. The solenoid affords the splitting and control of four separate actuation or flow sequences. One hose from the solenoid traverses forward through the rear housing unit and is connected to a common fitting at the vertical face boring in the forward housing unit. Flexible hose is then re-established via a fitting in the articulation space between the back and front lower housing units. The flexible hose is then reattached to the back vertical face of the forward housing unit. The flexible hose is then re-established inside the forward housing unit and is connected to by common fitting and flow control valve to the "push" intake port of a pneumatic actuator that affords a reciprocation function. A second flexible hose form the exhaust port in the solenoid travels with the exact same path and design as the first hose but connects to the "pull" end of the pneumatic actuator via a common fitting and flow control valve. In pneumatic sequencing for reciprocation, the speed of reciprocation is adjustable via the flow control valves. In electromagnetic sequencing, the reciprocation speed is determined by adjustment of the programmable logic controller (PLC) via electrical current. It will be appreciated that an electromagnetic actuator does not need the air supply and is controlled via electrical current and PLC which replaces the solenoid.

The third and fourth flexible air lies from the exhaust ports of the solenoid travel with the same design and path as the air lies to the pneumatic actuator but traverse through the front lower housing unit in the same fashion as the turbine motor air supply as stated earlier. These two air lines then connect via common fitting to the "push" and the "pull" ports of the pneumatic termination rod actuator which is located and mounted on the top of the reciprocation head.

It should be noted that the pneumatic termination rod actuator is often replaced with an electromagnetic rod actuator for certain applications and is controlled with an electronic PLC in lieu of a solenoid. With both the reciprocation and termination rod functions, it is a quick retrofit to interchange these methods.

A termination rod actuator and termination rod are mounted on top of the reciprocating head. The termination rod is extendible into an impingement block. The action of the termination rod is simply one forward one reverse stroke of the rod that opens and closes the stream orifice. The two heated components of the liner material come together and are mixed in an adjustable impingement module inserted into the impingement block. The module is attached to the isocyanate and amine resin product feeds. In one embodiment, the isocyanate enters at the rear of the module and the amine resin enters at the front of the module. The module may be adjustable by creating up to six orifices that line up with the feed orifices of the impingement block. A variation in size of the drilled orifices adjusts the amount of flow based on volume and is in direct relationship to the viscosity of the isocyanate and amine resin. The module is slid over the termination rod. The module fits into the front of the impingement block. A male fitting of the module fits through the impingement block. The stream tip is pushed onto the male component of the module. A stream tip cap is then threaded on the impingement block, thereby locking the module in place. Air is supplied to the stream tip cap via a small boring in the front of the impingement block. The air is supplied to this boring via a channel that is cast in the impingement block and in which has an opening orifice on the bottom of the block. A small air line is connected to this orifice to supply air to the channel and ultimately to the spray stream cap. There may be a second threaded connector on the back side of the impingement block at the orifice. This connector comprises a threaded sealing nut with a vicon seal that compresses against the termination rod.

The termination rod penetrates through the front and back of the conical shaped module mounted within the impingement block. When the termination rod is fully extended forward, the end of the rod is seated on the back side of the stream tip to seal the liner flow. When the termination rod is retracted, the rod end passes through the drilled module orifice allowing product to flow into the module orifice and mix at high pressure. The product then streams from the stream tip to the dissipation device.

The two components of the liner material come together and are mixed in the impingement block. The components are isocyanate and amine resin.

The termination rod actuators are attached to machined termination rods via machine threads. Termination rods traverse forward from the actuator connection in a slight downward and adjustable angle. The termination rod penetrates impingement block in the center preferably with a compression fitting with a kalrez seal and orifice that is attached via a threaded boring in the impingement block. The termination rod then traverses through a polymer module until it reaches a termination point at the back recessed side of a machined stream tip. The stream tips may be machined with variable sized orifices from 0.015" to 0.090" depending upon the flow needed for the particular lining application. The instant invention also has a different design of the termination rod actuator—it has a much higher pull force coupled with a function that allows for some "free" pull force momentum to build prior to actuating the termination rod. This allows the rod to brake free therefore allowing unlimited open and close cycles.

The polymer module has a 0.125 longitudinally ported orifice to receive the termination rod. The termination rod is self sealing due to light compression to the module surface. The module is drilled with orifices at right angle to the longitudinal orifice in the module. These orifices range from 0.010" to 0.080 depending on the flow needed. The orifices serve as supply ports for the lining components. A minimum of two and a maximum of six orifices are drilled into the module at right angles. These orifices facilitate the flow of both components of the lining material from a spray tip. It will be appreciated that the lining components are separated completely and maintained in separate storage containers until they impinge at high pressure and heat inside the mixing module as described above. Upon mixing in these conditions (heat and pressure), there is a snap cure of between approximately 3 seconds to 1 minute depending upon the product and application criteria. In one embodiment utilizing the reaction product of isocyanate and amine resin, the product cures in approximately 5 seconds.

The components enter the impingement block separately and enter into the chambers via machined orifices. The chambers may contain a mesh screen to filter impurities out of the components. These screens may also be in line in various impingement block designs depending on size constraints of pipe to be lined. Once filtered, the product flows via orifices to the face of a recessed orifice in the impingement block that holds the described module. This recessed orifice has circumferential groves in which align with the pre drilled orifices in the module. Once under pressure, these grooves fill up with product. Upon remote activation of termination rod, the rod is partially retracted reversely out of the module orifice allowing product in grooves to enter the mixing chamber via pre drilled orifices. The product is then projected due to applied pressure through the stream tip orifice and a predetermined and adjustable angle to be received on the landing slope of the first inverted conical section of the rotating dissipation device. This landing slope is proximate to the center top of the dissipation device.

The dissipation device may be comprised of high density nylon, Kevlar reinforced nylon, or metal. Other materials may be used such as fiber reinforced polymers. The angles of the side walls of the dissipation device may be approximately 80 degrees for the center top and approximately 60 degrees for the outer flange.

The reciprocating head also contains a high velocity and high torque air turbine motor. This motor powers a rotating shaft that extends from the front of the reciprocating head. In one embodiment, the rotating shaft is 12 inches long. In another embodiment, the rotating shaft is 6 inches long. The rotating shaft may be comprised of high density nylon, Kevlar reinforced nylon, or metal. A dissipation device is mounted on the end of the rotating shaft and at a preset distance from the impingement block. The dissipation device can rotate between 20,000 and 45,000 rpm at high torque of approximately 20 foot pounds.

Mounted on the reciprocating head adjacent to the rotating shaft is an optional shaft scraper. This long slender device removes overspray and deposits on the rotating shaft.

Proximate to the mounting hardware of the shaft scraper is the air tube outlet for the air ionization unit generating negatively charged air. This generator may be located in the first rear housing with a tube traversing the front housing and into the reciprocating head. The tube blows a stream of negatively charged air across the rotating shaft and into the dissipation unit. This eliminates static. Static electricity entraps small quantities of the liquid liner onto surfaces of the apparatus, i.e., the rotating shaft and dissipation device. The entrapment continues until the rotating shaft and dissipation device are heavily coated and their function is interrupted. This can force shut down of the apparatus for cleaning before lining can continue.

The operation of the shaft scrapper and ionization unit result in continuous lining of the pipe. This lining process benefits the environment by creating a well bonded and uniform thickness pipe liner. The absence of fault minimizes the migration of effluent from the pipe.

The design of the dissipation device minimizes unintended and undesired back spray upon the lining apparatus. Prior art using an oblique or flat rotating device to disperse the lining mixture has experienced spray blocking the spray tip.

The forward and reverse motion of the reciprocating head may cause the dissipation device to move forward and reverse between 0.001 to 5 inches. The impingement block and termination rod are mounted on top of the reciprocating head, thereby causing the stream from the impingement block to maintain its fixed relationship to the dissipation device.

The impingement block mixes the liner components. The liquid liner is projected out of an orifice of the impingement block by the withdrawal or retraction of the termination rod to the termination rod actuator.

FIG. 4 illustrates the liquid liner 420 streaming from the impingement block to the dissipation device 400. The liner streams on to the center flange 401 near the center top 403. Also shown is the center annulus 410 where the rotating shaft (not shown). The liquid liner flows down the side 421 of the center flange to the pocket 422 formed at the juncture 405 of the two opposing acute sides of the dissipation device. The liner material 422 has an opportunity dwell within the pocket 405 and where the curing process can continue. The liner material progresses up the slope of the outer flange and is pulled over the edge 404. The liner material is shown at the edge 424 and pulled 425 to the sides of the pipe wall 485 where it cures and forms and inert liner.

Continuing, the angle of trajectory of the liquid liner causes it to stream onto the interior acutely angled side of the rotating dissipation device. This is proximate to the center top of the device. The liner strikes the dissipation device at between 1700 to 3,500 psi dependant on material viscosities. The dissipation device is shaped like a letter "W". The middle portion is designated the center top. The inside portion of the bottom of the W is the pocket segment of the dissipation device wherein the liquid liner can briefly dwell and equalize its mass before being pulled over the outer flange by the operation of centrifugal force. Due to the rapid rotation of the dissipation device, the curing liquid liner sprayed from the device evenly lines the interior pipe in a 360 degree circumference.

The path of the liquid liner begins at the landing zone proximate to the center top of the rapidly rotating dissipation device. The liner material descends down the acute slope to the pocket area formed at the intersection of the interior slope and outer flange. The liner material progresses up toward the outer flange where it is thrown against the pipe wall surface. The timing of this progression is critical in consideration of the cure time of the liner. It is undesirable for the liner to cure while within the dissipation device. Also it is undesirable for the liner to be coated onto the pipe wall too long before it cures. This can result in the liner sagging or migrating from the top of the pipe. The configuration or geometry of the dissipation device may be specifically selected to address these concerns.

The dissipation device also has a self cleaning function. Small quantities of liquid liner material may migrate toward the center top. The high velocity stream from the stream orifice of the impingement block trims these quantities of liner material.

The dissipation device of the instant disclosure has the ability to counter rotate either through transfer or air from exhaust to intake and reverse. More typically this is done through electronically switched bi-directional transmission or transfer case that is in between the shaft and the air motor collet. The reason for this is that high rpm air motors easily wear out if they are run in both directions. Compounding this problem in the prior art is that the units do not have the ability to start and stop flow of the lining material. Flow must be stopped while the motor is being reversed in rotation. The flow may be readily stop by movement of the termination rod.

In one embodiment, each housing unit is supported on skids which permit the apparatus to be pulled through the pipe during the lining operation. The skids may be made of metal. This pulling may utilize a tether attached to the front housing. In another embodiment, the height of the skids may be adjustable in order that the rotating shaft and dissipation device are proximate to the center point of the circular pipe.

In another embodiment, each housing unit includes one or more powered wheels or tracks. The direction of the apparatus, e.g., forward and backward, can be remotely controlled utilizing the lights and cameras. The tracks can be powered by air or electricity. In one embodiment, the tracks are powered by 24V gear driven servo motors that are located inside the track apparatus.

Speed of the robot apparatus is determined by a formula that takes flow/required liner thickness/pipe diameter into account. Speed is controlled remotely by a speed control that is wired to an encoder on the umbilical reel. This encoder is a 2400 bit and is connected to a program logic controller (PLC). If speed is set for example at 2 feet per minute, the encoder adjusts the reel speed automatically no matter the torque on the umibilcal or diameter of umbilical on the reel. The reel will constantly pull at whatever speed determined through the formula the apparatus needs to travel at. This can be adjusted "on the fly" if a different lining thicknesses in different areas of the pipe segment. Direction or precise location of the apparatus in the pipe, while helped by the camera, is really controlled by a positioning indicator in the remotely positioned control room. The lining operation is monitored and controlled from the control room. Again an encoder sends a signal to a data display telling the operator at what foot mark he is at in the pipe.

This specification is to be construed as illustrative only and is for the purpose of teaching those skilled in the art the manner of carrying out the invention. It is to be understood that the forms of the invention herein shown and described are to be taken as the presently preferred embodiments. As already stated, various changes may be made in the shape, size and arrangement of components or adjustments made in the steps of the method without departing from the scope of this invention. For example, equivalent elements may be substituted for those illustrated and described herein and certain features of the invention may be utilized independently of the use of other features, all as would be apparent to one skilled in the art after having the benefit of this description of the invention.

While specific embodiments have been illustrated and described, numerous modifications are possible without departing from the spirit of the invention, and the scope of protection is only limited by the scope of the accompanying claims.

The invention claimed is:

1. An in situ pipe lining apparatus comprising:
   a) an umbilical comprising at least one air hose, at least one electrical power cable, at least one video communication cable, and lining component hoses;
   b) a housing including at least one heater for heating lining components;
   c) a reciprocating head moveably attached to the housing and including a rotating shaft holding a rotating dissipation device shaped as two asymmetrical reversely aligned cones with a center top attached to the rotating shaft and with an acute angled flange oriented to the reciprocating head wherein the rotating dissipation device forms an acute angle to a lining stream proximate to the center top;
   d) an impingement block attached to the reciprocating head wherein the impingement block mixes the lining components and projects the lining at a specific angle of trajectory to the rotating dissipation device; and
   e) a remotely activated termination rod extending through the impingement block wherein heated and pressurized lining components enter the block and are mixed and projected out of a stream tip orifice to the dissipation device by retraction of the termination rod.

2. The apparatus of claim 1 further comprising a first lining component of heated isocyanate and a second lining component of a heated amine resin.

3. The apparatus of claim 1 further comprising applying a lining containing no volatile organic compounds or chlorofluorocarbons.

4. The apparatus of claim 3 wherein the apparatus heats and highly pressurizes the liner components and causes the mixed liner to cure in approximately 5 seconds.

5. The apparatus of claim 1 wherein the liner is impervious to effluent and prevents the migration of effluent from the pipe into the environment.

6. The apparatus of claim 1 further comprising a stream of negatively charged ions directed to the rotating dissipation device.

7. The apparatus of claim 1 further comprising the rotating dissipation device rotating in a range of between 20,000 and 45,000 rpm.

8. The apparatus of claim 7 further comprising lining material that moves back toward the center top is removed by the force of the lining stream projected from the impingement block.

9. The apparatus of claim 1 further comprising a motor driven propulsion device to move the apparatus forward and reverse in a pipe.

10. The apparatus of claim 1 further comprising articulated housing sections permitting the apparatus to maneuver through bends.

11. The apparatus of claim 1 further comprising a pocket segment and the acutely angled flange oriented to the reciprocating head and wherein the lining stream impacts the dissipation device and moves forward and up an interior acute angled flange of the spinning surface to the pocket segment and up the acute angled flange wherein the lining stream is projected off of the flange edge and onto the pipe wall.

12. The apparatus of claim 1 further comprising the rotating dissipation device moving forward and reverse in relation to the apparatus.

13. The apparatus of claim 12 further comprising the rotating dissipation device moving between 0.001 to 5 inches in a forward and reverse direction.

14. The apparatus of claim 1 further comprising the projected lining strikes the rotating dissipation device in a range of between 1700 to 3,500 psi.

15. An in situ pipe lining apparatus comprising:
   a) an umbilical comprising at least one air hose, at least one electrical power cable, and hoses for lining components;
   b) a first rear housing attached to a second front housing and the second front housing attached to a reciprocation head;
   c) at least one heater for the heating the lining components;
   d) an air powered turbine located in the reciprocation head rotating a shaft holding an inverted conical rotating dissipation device;
   e) an impingement block attached to the top of the reciprocation head for mixing the lining components and projecting the lining to the dissipation device; and
   f) a generator of negatively charged air located in the first rear housing and projecting the negatively charged air onto the rotating dissipation device.

16. The pipe lining apparatus of claim 15 further comprising:
   a) a four way air valve solenoid;
   b) a push port connected to a pneumatic or electromagnetic actuator;
   c) a pull port connected to the pneumatic or electromagnetic actuator;
   d) a push port connected to a pneumatic or electromagnetic termination rod actuator; and
   e) a pull port connected to the pneumatic or electromagnetic termination rod actuator.

* * * * *